United States Patent
Walter et al.

(10) Patent No.: US 7,411,138 B2
(45) Date of Patent: Aug. 12, 2008

(54) WEIGHING SYSTEM HAVING AN ANGLE LEVER WITH A LONG VERTICAL LEVER ARM

(75) Inventors: Fabian Walter, Goettingen (DE); Otto Kuhlmann, Goettingen (DE); Peter Fleischer, Goettingen (DE); Wilfried Langner, Bovenden (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 11/698,977

(22) Filed: Jan. 29, 2007

(65) Prior Publication Data

US 2007/0193788 A1 Aug. 23, 2007

Related U.S. Application Data

(63) Continuation of application No. PCT/EP2005/007662, filed on Jul. 14, 2005.

(30) Foreign Application Priority Data

Jul. 27, 2004 (DE) .................... 20 2004 011 793 U

(51) Int. Cl.
*G01G 7/04* (2006.01)
(52) U.S. Cl. ................. 177/210 EM; 177/212
(58) Field of Classification Search .......... 177/210 EM, 177/212
See application file for complete search history.

(56) References Cited

U.S. PATENT DOCUMENTS

| 4,100,985 | A | * | 7/1978 | Meier ........................... 177/189 |
| 4,354,563 | A | * | 10/1982 | Luchinger et al. ............ 177/212 |
| 4,799,561 | A | * | 1/1989 | Komoto ....................... 177/229 |
| 5,315,073 | A | * | 5/1994 | Ast et al. ...................... 177/212 |
| 5,962,818 | A | * | 10/1999 | Komoto et al. ............... 177/229 |
| 6,472,618 | B1 | * | 10/2002 | Izumo et al. ........... 177/210 EM |

FOREIGN PATENT DOCUMENTS

| DE | 31 27 939 A1 | 4/1982 |
| DE | 195 40 782 C1 | 12/1996 |

* cited by examiner

*Primary Examiner*—Randy W Gibson
(74) *Attorney, Agent, or Firm*—Sughrue Mion, PLLC

(57) ABSTRACT

A weighing system that operates according to the principle of electromagnetic force compensation, having two connecting rods (2, 3) which are fashioned as a parallel guide and connect a load receiver (4) to a base area (1) fixed to the housing, and having an angle lever (5) mounted on the base area. The force due to weight that is transmitted by the load receiver acts upon the short lever arm (5') of the angle lever via a coupling element, and a coil projecting into the air gap of a permanent magnet system (7) is fastened to the long lever arm (5"). The weighing system occupies only a small area since the long lever arm takes the form of a vertical lever arm and extends, at least in part, in the area underneath the connecting rods of the parallel guide. The permanent magnet system is likewise arranged underneath the connecting rods of the parallel guide.

13 Claims, 3 Drawing Sheets

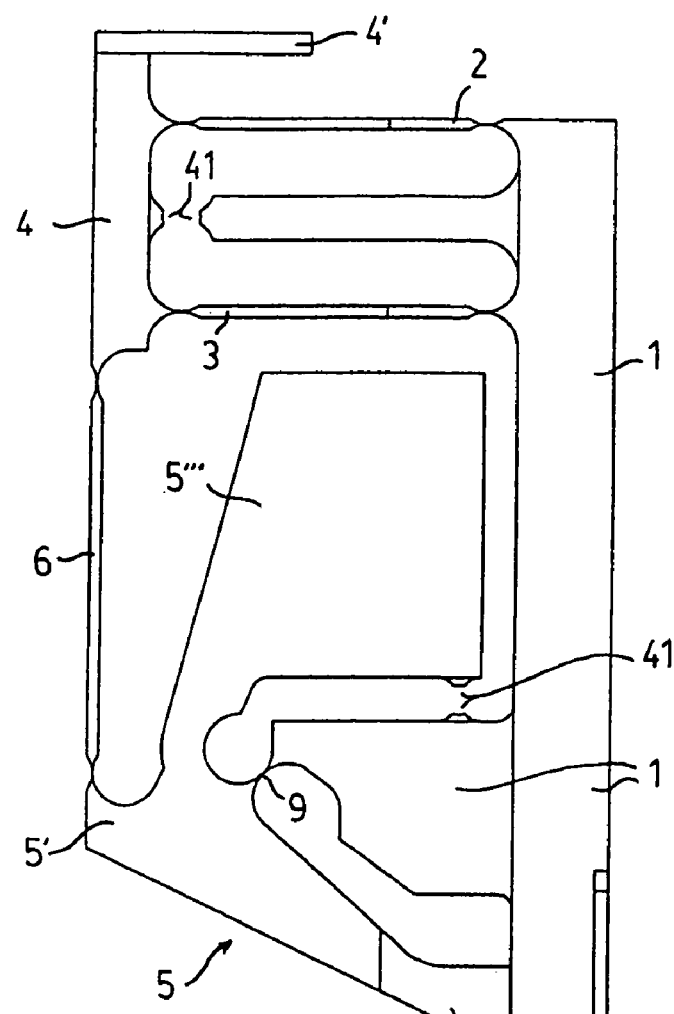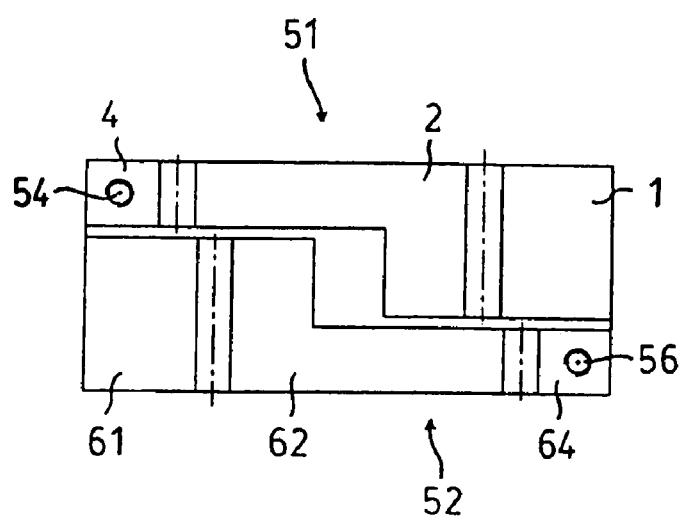

WEIGHING SYSTEM HAVING AN ANGLE LEVER WITH A LONG VERTICAL LEVER ARM

This is a Continuation of International Application PCT/EP2005/007662, with an international filing date of Jul. 14, 2005, which was published under PCT Article 21(2) in German, and the disclosure of which is incorporated by reference into this application in its entirety.

FIELD AND BACKGROUND OF THE INVENTION

The invention relates to a weighing system operating according to the principle of electromagnetic force compensation, having two connecting rods which, in the form of a parallel guide, connect a load receiver to a base fixed to the housing, and having an angle lever mounted to the base area. The weight force transmitted by the load receiver acts on the short lever arm of the angle lever, and a coil projecting into the air gap of a permanent magnet system is fixed to the long lever arm of the angle lever.

A weighing system of this type is disclosed, for example, in German publication DE 31 27 939 C2. German publication DE 195 40 782 C1 also describes such a weighing system, which is in addition provided with a second angle lever.

SUMMARY OF THE INVENTION

Both of the above weighing systems require a relatively large base area, however, so that they are not optimal for applications where several weighing system are to be spaced close together side-by-side. Thus, the object of the invention is to provide a weighing system of the aforementioned type, which requires only a small base area.

According to the invention, this object is attained in that the long lever arm is configured as a vertical lever arm, which extends at least partially into the area below the connecting rods of the parallel guide, and that the permanent magnet system is also disposed below the connecting rods of the parallel guide.

The heretofore conventional side-by-side arrangement of the angle levers and the permanent magnet system in the area between the connecting rods is thus abandoned. Instead, the permanent magnet system and the long lever arm with the coil are relocated to the area below the connecting rods. In combination with short connecting rods, this results in a weighing system with a small base. Despite the small horizontal dimensions of the weighing system, the length of the long lever arm is not limited in practice, since a longer long lever arm increases only the overall height. As a result, a large transmission ratio can be realized even with a single lever.

Advantageous embodiments are set forth in the dependent claims.

If, in a particularly advantageous embodiment, the load receiver of the weighing system is made narrower than the base area, a plurality of weighing systems may be spaced very closely in a row. Each second weighing system is then disposed so as to be rotated 180° about a vertical axis, such that the load receiver of the one weighing system is located next to the base area of the adjacent weighing system. As a result, the minimum lateral distance between adjacent weighing systems is no longer defined by the width of the base area but by the (smaller) half sum of the width of the base area and the width of the load receiver. This nevertheless leaves a relatively wide base area to support the connecting rods against lateral forces acting on the weighing tray.

Two adjacent weighing systems that are installed so as to be rotated 180° in relation to each other may also be combined into a pair. As a result, the permanent magnet system of each weighing system may be as wide as two weighing systems, and the two permanent magnet systems of the pair may also be combined into a common permanent magnet system with two air gaps.

BRIEF DESCRIPTION OF THE DRAWINGS

The invention will now be described with reference to the figures, in which:

FIG. 4 shows the configuration of FIG. 1 in an actual embodiment,

FIG. 6 shows the configuration of two weighing systems according to FIG. 4 in a top view.

DETAILED DESCRIPTION OF EXEMPLARY EMBODIMENTS

Figure 1:
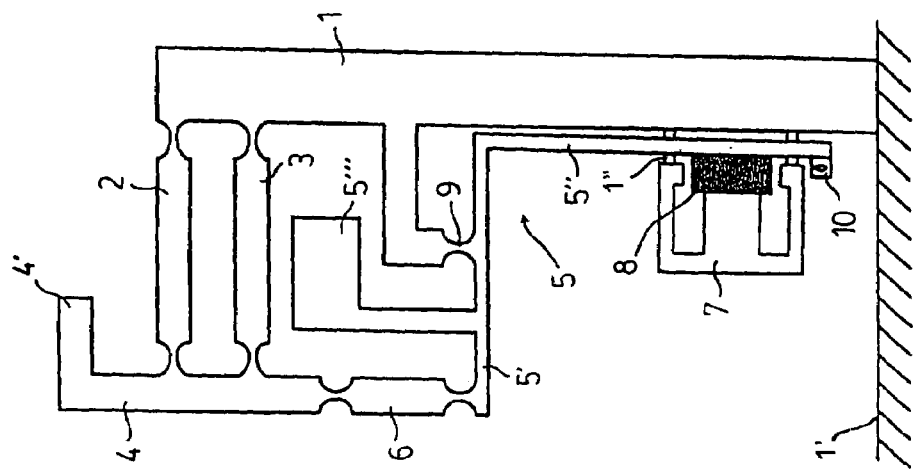
FIG. 1 schematically shows a first configuration of the weighing system in a side view, FIG. 2 schematically shows a second configuration of the weighing system in a side view, FIG. 3 schematically shows a third configuration of the weighing system in a side view.

The weighing system, which in FIG. 1 is shown only schematically in a side view, has a base 1 extending from a surface 1', two connecting rods 2 and 3, a load receiver 4, an angle lever 5, a coupling member 6 for transmitting the weight force to the short lever arm 5' of the angle lever, a permanent magnet system 7, and a coil 8 which is fixed to the long lever arm 5" of the angle lever and which is located in the air gap of the permanent magnet system 7. The angle lever 5 is supported on the base 1 so as to be pivotable at a thin spot 9 in the material. Corresponding thin spots in the material indicate the linkage points on the connecting rods 2 and 3 and the coupling member 6. The combined center of gravity of the angle lever 5 and the coil 8 is shifted by means of a top weight 5''' such that it lies at least approximately at the level of the fulcrum (thin spot 9 in the material). The permanent magnet system 7 is coupled to the base 1 by means of supports 1". FIG. 1 further shows a tab 10 with a slot, which forms part of an optical scanner (not depicted) for regulating the compensation current through the coil 8. The figure further shows a horizontal projection 4' on the load receiver 4 to indicate a weighing tray. The operation of the weighing system summarized above is generally known in the art so that a detailed described need not be repeated here.

The geometric configuration according to the invention—as shown in the figure—is characterized in that the entire angle lever 5 is disposed below the connecting rods 2 and 3 of the parallel guide, its long lever arm 5" extends vertically, and the permanent magnet system 7 is also located below the connecting rods of the parallel guide. This geometric arrangement makes it possible to minimize the horizontal extent in the drawing plane. Even perpendicular to the drawing plane (i.e. into the drawing page, as shown) the weighing system takes up very little room. The long lever arm 5" of the angle lever can nevertheless be designed with a practically arbitrary length to obtain a large force reduction ratio.

Figure 2:
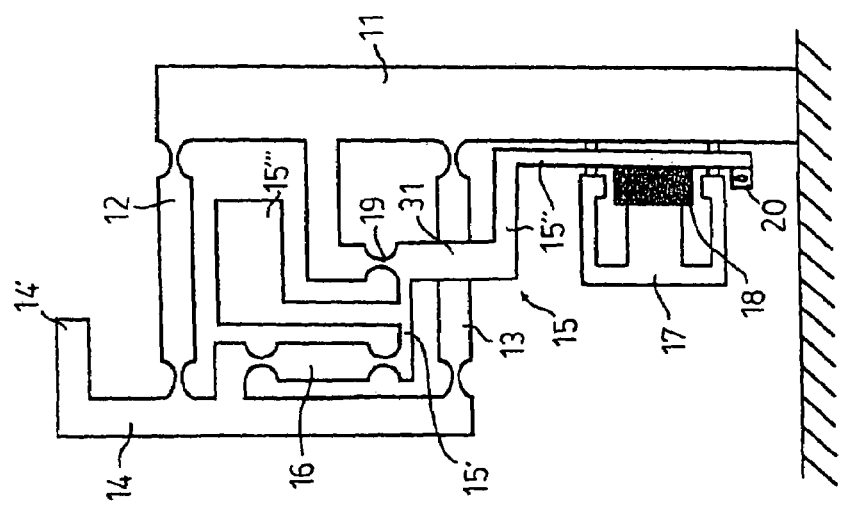

The second configuration of the weighing system shown schematically in a side view in FIG. 2 differs from the first configuration described above in that the short lever arm 15' of the angle lever 15 and the coupling member 16 are located above the lower connecting rod 13. This has the advantage that the vertical distance between the connecting rods 12 and 13 can be selected larger. As a result, the forces in the connecting rods in case of off-center loading of the weighing tray are reduced. This advantage comes at the price of the disadvantage that the angle lever 15 crosses the lower connecting rod 13 at 31, i.e., the width (perpendicular to the drawing plane) of these two parts must be reduced at that point. The components with the reference numerals 11, 12, 14 and 17 to 20 not previously mentioned correspond to those having the reference numerals 1, 2, 4 and 7 to 10 in FIG. 1.

Figure 3:
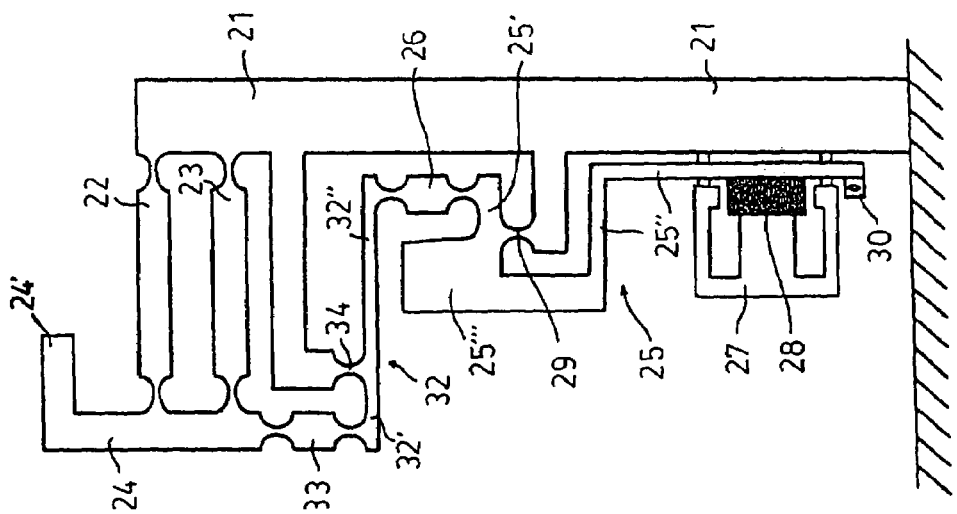

The third configuration of the weighing system shown in a schematic side view in FIG. 3 distinguishes from the first configuration by the presence of an additional transmission lever 32. The transmission lever is pivotably supported on the base 21 by a thin spot 34 in the material. On the short lever arm 32' of the transmission lever, the weight force from the load receiver 24 is introduced via a coupling member 33. At the end of the long lever arm 32", the reduced force is transmitted to the angle lever 25 via a coupling member 26. This additional transmission lever 32 in interaction with the angle lever 25 makes it possible to obtain a substantially greater force reduction. The components with the reference numerals 22, 23, and 27 to 30 not previously mentioned correspond to those identified in FIG. 1 by the reference numerals 2, 3, and 7 to 10.

FIGS. 1 through 3 depict the weighing system only highly schematically. In contrast, FIG. 4 shows an actual embodiment that corresponds to the schematic configuration depicted in FIG. 1. Components having the same function as the components depicted in FIG. 1 are identified by the same reference numerals even if they have a different geometric shape. Visible are again the base 1, the connecting rods 2 and 3, the load receiver 4, the coupling member 6, the angle lever 5, and the coil 8. The long lever arm 5" of the angle lever is narrower than the rest of the weighing system and partially extends in a relief cut (not visible in FIG. 4) in the base 1. The base 1, the connecting rods 2 and 3, the load receiver 4, the angle lever 5, the coupling member 6, and the tab 10 are formed integrally from a single metal block, e.g., by milling or spark machining. To protect this part during the machining process and while the remaining components (coil, weighing tray, etc.) are mounted, thin fixation points 41 are provided, which are separated only after assembly. FIG. 4 shows these thin fixation spots already separated. The permanent magnet system is not shown in FIG. 4 for the sake of clarity.

Figure 5:
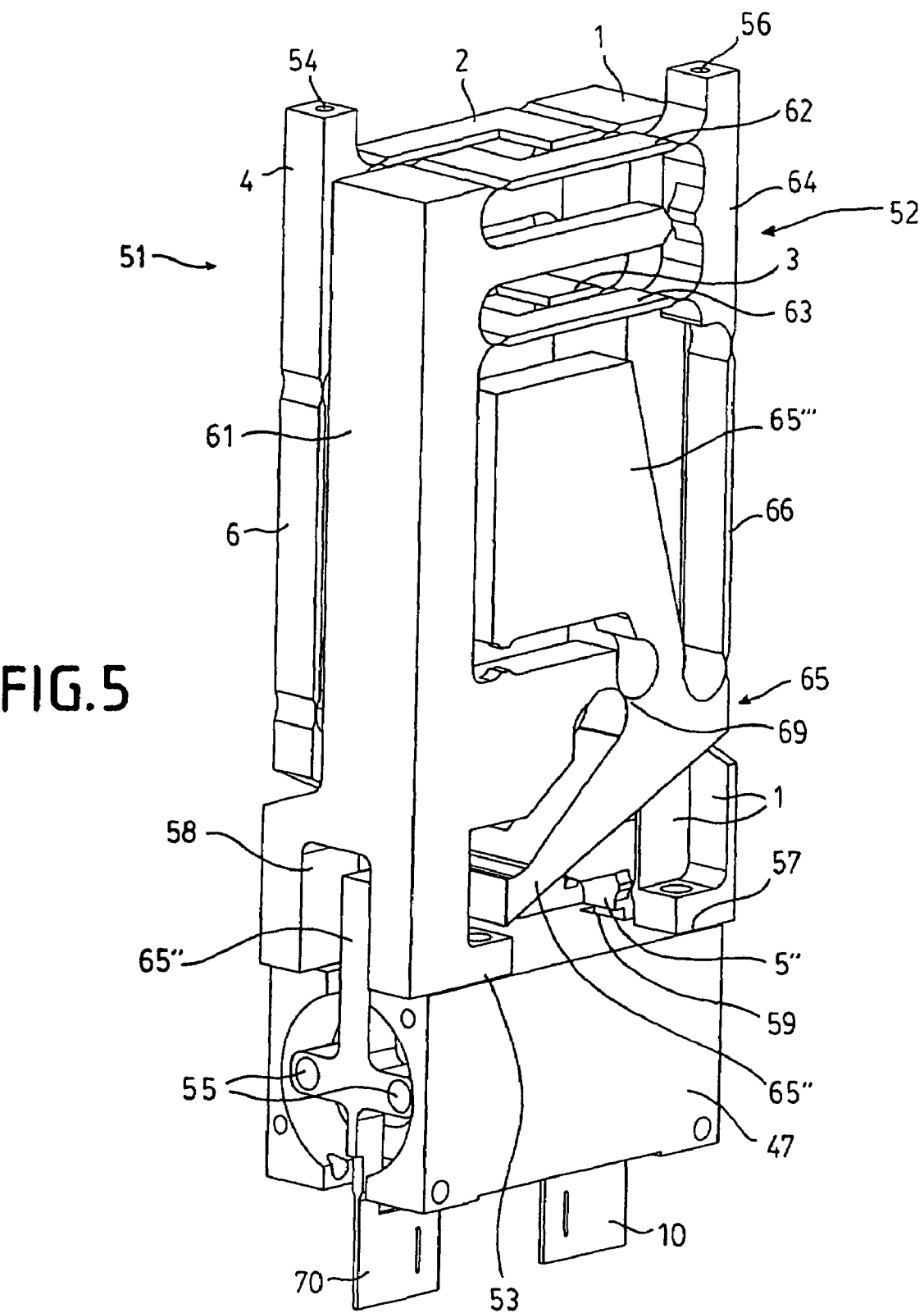
FIG. 5 shows the configuration of two weighing systems according to FIG. 4 in a perspective view.

FIG. 5 and FIG. 6 show a space saving arrangement of two weighing systems according to FIG. 4 that are combined into a weighing system pair. FIG. 5 is a perspective view, FIG. 6 a top view. The rear weighing system 51 is shown in the view depicted in FIG. 4. Visible are the load receiver 4, the upper connecting rod 2, the base 1, the coupling member 6, the tab 10, and the lower connecting rod 3 (partly hidden). The front weighing system 52 is identical to the rear weighing system 51 but is mounted so as to be rotated 180° about a vertical axis. Of the front weighing system 52 shown in FIG. 5 are visible the base 61, the connecting rods 62 and 63, the load receiver 64, the angle lever 65 with its long lever arm 65" and its top weight 65''', the coupling member 66, the thin spot in the material 69 for supporting the angle lever 65, and the tab 70. The coil for the electromagnetic force compensation is not visible, only the fastening holes 55 on the long lever arm 65". Also visible is the permanent magnet system 47, which on its left side—as seen in FIG. 5—has an air gap for the coil of the front weighing system 52 and on its right side—as seen in FIG. 5—an air gap for the coil of the rear weighing system 51. The external soft iron return path of the permanent magnet system 47 is rectangular and simultaneously serves to fasten the two bases. To this end, the base 61 of the front weighing system 52 has a fastening foot 53 and the base 1 of the rear weighing system 51 a fastening foot 57.

FIG. 5 further shows that the long lever arm 65" of the angle lever 65 is narrower than the remaining parts of the front weighing system 52 and extends within a relief cut 58 in the base 61. This relief cut has already been described in connection with FIG. 4. In FIG. 5 only a short piece of the long lever arm 5" of the rear weighing system 51 is visible in the relief cut 59.

It is evident in FIG. 5 and even more so in the top view of FIG. 6 that the load receiver 4 or 64 is narrower than the base 1 or 61 of the respective weighing system 51 or 52. This makes possible a greater width of the base for a given width of the weighing system pair 51/52 and thus a wider support of the connecting rods, which is advantageous when lateral forces act on the load receiver. In the embodiment shown in FIG. 5 and FIG. 6 the width of the connecting rods changes in a step. Changes other than a single step, e.g. a gradual transition from the width of the base to the load receiver, are of course also possible. Furthermore, in the embodiment shown in FIG. 5 and FIG. 6, the step in the width of the connecting rods is provided only on one side. This has the advantage that the outer contour of the weighing system pair 51/52 is exactly rectangular, which in combination with the likewise rectangular permanent magnet system 47 leads to a very efficient use of space if several weighing system pairs 51/52 are to be closely spaced side by side perpendicular to the connecting rods. It is of course equally feasible to use connecting rod forms in which the width of the connecting rods changes symmetrically on both sides so as to form a trapezoid or a "T," for example, as seen in top view.

In the weighing system shown in FIG. 5 and FIG. 6, the means to mount a weighing tray is indicated only by a threaded bore 54 or 56. Depending on the application, a weighing tray may be mounted directly above the threaded bore, or it may be mounted to a cantilevered arm, for example, so that all the weighing trays of the weighing system pairs placed side by side in a row are in alignment.

The part of the optical position sensor that is fixed to the housing and that is not shown in any of the figures for reasons of clarity is mounted to the underside of the permanent magnet system 47. It includes, for example, a light emitting diode that illuminates the slot in the tab 10 or 70 and two photodiodes that respond to the light passing through the slot and that conventionally regulate the current passing through the coil of the electromagnetic force compensation. Because of the arrangement of the position sensor below the permanent magnet system 47, the lever arm is particularly large for the slot so that the position sensor is highly sensitive.

The above description of exemplary embodiments of the invention has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Weighing system operating according to the principle of electromagnetic force compensation, comprising:

two connecting rods, which, in the form of a parallel guide, connect a load receiver to a base that is fixed to a housing, and an angle lever supported on the base and having a short lever arm and a long lever arm, the short lever arm being configured to receive a weight force transmitted from the load receiver via a coupling member, and the long lever arm being fixed to a coil projecting into an air gap of a permanent magnet system, wherein the long lever arm is embodied as a vertical lever arm and extends at least partially into an area below the connecting rods of the parallel guide, and the permanent magnet system is also disposed below the connecting rods of the parallel guide.

2. Weighing system as claimed in claim 1, wherein the angle lever is disposed entirely below the connecting rods of the parallel guide.

3. Weighing system as claimed in claim 1, wherein a position sensor regulating the compensation current is disposed below the permanent magnet system.

4. Weighing system as claimed in claim 1, wherein a center of gravity of the angle lever lies at least approximately at a fulcrum of the angle lever.

5. Weighing system as claimed in claim 1, wherein the base, the connecting rods, the load receiver, the angle lever, and the coupling member are integrally formed from a single metal block.

6. Weighing system as claimed in claim 1, further comprising an additional transmission lever.

7. Weighing system as claimed in claim 1, wherein the load receiver is narrower than the base.

8. Arrangement of at least two weighing systems, each as claimed in claim 1, and placed side by side such that the load receiver of one of the weighing systems is located next to the base of another of the weighing systems.

9. Arrangement as claimed in claim 8, wherein the two adjacent weighing systems are combined into a weighing system pair.

10. Arrangement as claimed in claim 9, wherein the respective permanent magnet systems of the weighing system pair are combined into a single permanent magnet system having two air gaps.

11. A weighing system, comprising:
    a load receiver;
    a base mounted on a surface;
    a parallel guide interconnecting the load receiver and the base, and comprising at least two connecting rods;
    a magnet system; and
    a lever mounted to the base and comprising at least a shorter lever arm and a longer lever arm, the shorter lever arm configured to mechanically interact with the load receiver and the longer lever arm being connected to a coil configured to electromagnetically interact with the magnet system;
    wherein the magnet system is confined to an area between the parallel guide and the surface, and the longer lever arm extends at least partly into the area.

12. The weighing system according to claim 11, wherein the longer lever arm and the magnet system are confined to the area.

13. The weighing system according to claim 12, further comprising an additional lever mounted to the base and also confined to the area.

* * * * *